(12) United States Patent
Saito

(10) Patent No.: US 10,440,203 B2
(45) Date of Patent: Oct. 8, 2019

(54) ADJUSTING COLOR TONE FOR PRINTING USING DISPLAY OF VIRTUAL OBJECT TOGETHER WITH MARKER ARRANGED IN REAL ENVIRONMENT

(71) Applicant: KONICA MINOLTA, INC., Chiyoda-ku, Tokyo (JP)

(72) Inventor: Shuta Saito, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/986,914

(22) Filed: May 23, 2018

(65) Prior Publication Data
US 2018/0365541 A1  Dec. 20, 2018

(30) Foreign Application Priority Data

Jun. 16, 2017 (JP) .................. 2017-118684

(51) Int. Cl.
*H04N 1/00* (2006.01)
*G06K 15/02* (2006.01)
(Continued)

(52) U.S. Cl.
CPC ..... *H04N 1/00246* (2013.01); *G06K 15/1818* (2013.01); *G06K 15/1868* (2013.01);
(Continued)

(58) Field of Classification Search
CPC .......... H04N 1/00015; H04N 1/00023; H04N 1/00034; H04N 1/00037; H04N 1/00045; H04N 1/00068; H04N 1/00082; H04N 1/00087; H04N 1/00408; H04N 1/0044; H04N 1/00493; H04N 1/00496; H04N 1/00506; H04N 1/00509; H04N 1/56; H04N 1/60; H04N 1/6011; H04N 1/6027; H04N 1/603; H04N 1/6033; H04N 1/6038;
(Continued)

(56) References Cited

U.S. PATENT DOCUMENTS

| 2005/0200868 A1* | 9/2005 | Yoshida | ............... H04N 1/6027 358/1.9 |
| 2007/0171440 A1* | 7/2007 | Yoshida | .................. G06T 5/009 358/1.9 |

(Continued)

FOREIGN PATENT DOCUMENTS

JP       2010170316 A     8/2010

*Primary Examiner* — Scott A Rogers
(74) *Attorney, Agent, or Firm* — Buchanan Ingersoll & Rooney PC

(57) ABSTRACT

A display includes a display unit, an image sensor that takes an image of a predetermined area and outputs the taken image, and a hardware processor that detects the marker in the taken image, generates differential color information between color data of the marker in the taken image and color data of the marker in the print image data, displays a virtual object which reproduces the print image data in the display unit, sets an object adjustment value for adjusting a color tone of the virtual object displayed on the display unit based on the differential color information, and calculates a print adjustment value for adjusting a color tone reproduced by the image forming apparatus based on the object adjustment value.

15 Claims, 9 Drawing Sheets

(51) Int. Cl.
  *H04N 1/50* (2006.01)
  *H04N 1/60* (2006.01)
  *G02B 27/01* (2006.01)

(52) U.S. Cl.
  CPC ....... *G06K 15/1878* (2013.01); *H04N 1/0044* (2013.01); *H04N 1/00408* (2013.01); *H04N 1/00493* (2013.01); *H04N 1/50* (2013.01); *H04N 1/603* (2013.01); *H04N 1/6013* (2013.01); *H04N 1/6027* (2013.01); *H04N 1/6088* (2013.01); *G02B 27/017* (2013.01); *G02B 2027/0141* (2013.01); *H04N 2201/0094* (2013.01)

(58) Field of Classification Search
  CPC .. H04N 1/6052; H04N 1/6055; G06K 15/025; G06K 15/026; G06K 15/1878; G06F 3/1204; G06F 3/1205; G06F 3/1208; G06F 3/1237; G06F 3/1253; G06F 3/1256; G02B 27/017; G02B 2017/0141
  See application file for complete search history.

(56) References Cited

U.S. PATENT DOCUMENTS

| | | | | |
|---|---|---|---|---|
| 2010/0251111 | A1* | 9/2010 | Ozaki | G06F 3/1208 715/274 |
| 2011/0310411 | A1* | 12/2011 | Hirano | H04N 1/6011 358/1.9 |
| 2015/0138232 | A1* | 5/2015 | Sugimoto | G06F 3/1205 345/633 |
| 2015/0138595 | A1* | 5/2015 | Sugimoto | H04N 1/0044 358/1.15 |
| 2017/0223229 | A1* | 8/2017 | Shojaku | H04N 1/6036 |
| 2018/0027132 | A1* | 1/2018 | Yamasaki | G06T 11/60 358/504 |
| 2018/0070065 | A1* | 3/2018 | Chen | H04N 1/6008 |

* cited by examiner

ADJUSTING COLOR TONE FOR PRINTING USING DISPLAY OF VIRTUAL OBJECT TOGETHER WITH MARKER ARRANGED IN REAL ENVIRONMENT

The entire disclosure of Japanese Patent Application No. 2017-118684 filed on Jun. 16, 2017, is incorporated herein by reference in its entirety.

BACKGROUND

Technological Field

The present invention relates to a print system, a display, a control method of a display and a non-transitory recording medium storing a computer readable program.

Description of the Related Art

Heretofore, an image forming apparatus is known which forms an image on a sheet based on print image data, and outputs the sheet on which the image is formed as a printed matter. A user can easily and quickly obtain a desired printed matter by making use of the image forming apparatus. This type of the image forming apparatus is provided not only with a function of outputting a printed matter but also with a function of adjusting a color tone reproduced by the image forming apparatus, i.e., the color tone of image formation.

Incidentally, for example, Japanese Unexamined Patent Application Publication No. 2010-170316 discloses a display which can superimpose a virtual object on an image of the real world. This display converts the color of a virtual object to be displayed by comparing color information of a marker with a marker color acquired by a camera to create a conversion formula.

SUMMARY

Meanwhile, when installed in an installation place (real environment), a printed matter is sometimes seen with a different color tone than expected by a user depending upon the environment of the installation place, i.e., a lighting condition, a shadowing condition and so forth. In this case, for the purpose of obtaining the color tone of a printed matter matched to the environment of the installation place, the printed matter has to be output again after adjusting the color tone which can be reproduced by the image forming apparatus to confirm the color tone of the printed matter in the installation place. Because of this, there is the disadvantage that it takes time to obtain a desired printed matter. Furthermore, even if a printed matter is output after adjusting the color tone, the printed matter might not be seen in an intended way so that it is needed to further repeat adjustment (printing) and confirmation of the color tone in the installation place.

Taking into consideration the above circumstances, it is an object of the present invention therefore to provide a print system, a display, a control method of a display and a program wherein a printed matter having a color tone which a user desires can be easily obtained even in various installation environments.

To achieve at least one of the abovementioned objects, according to an aspect of the present invention, a print system reflecting one aspect of the present invention comprises: an image forming apparatus; and a display that displays a virtual object with reference to a marker arranged in a real environment, the image forming apparatus comprising: a printer that outputs a printed matter; and a print controller that controls the printer, the print controller that: causes the printer to print out a marker based on a print image data for outputting the printed matter; and adjusts color tones expressed by the printer in accordance with a print adjustment value, and the display comprises: a display unit; an image sensor that takes an image of a predetermined imaging area and outputs the taken image; and a hardware processor that is operated to detect the marker in the taken image; generate differential color information relating to a differential color between color data of the marker in the taken image and color data of the marker in the print image data; display a virtual object which reproduces the print image data in the display unit; set an object adjustment value for adjusting a color tone of the virtual object displayed on the display unit based on the differential color information which is generated; and calculate the print adjustment value used in the image forming apparatus based on the object adjustment value which is set.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
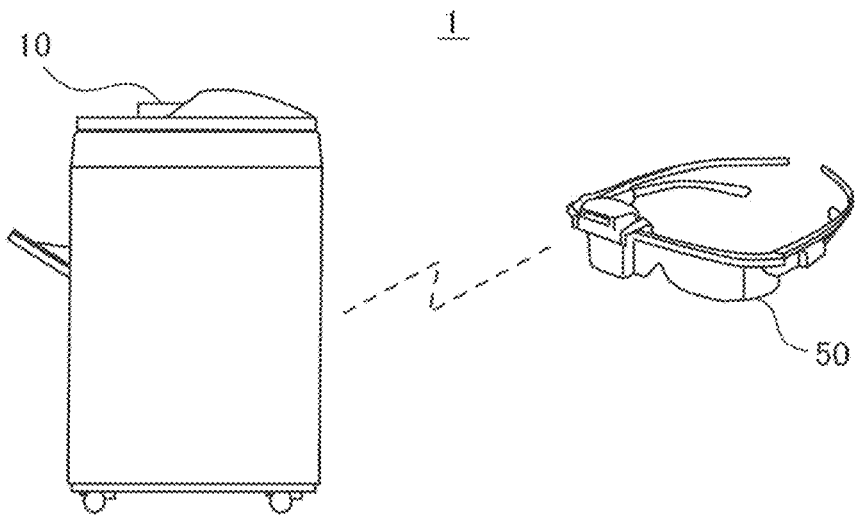
FIG. 1 is a view for schematically showing the configuration of a print system in accordance with a first embodiment.

FIG. 1 is a view for schematically showing the configuration of a print system 1 in accordance with the present embodiment. The print system 1 in accordance with the present embodiment includes an image forming apparatus 10 and a display 50. The image forming apparatus 10 and the display 50 can communicate with each other through communication means such as wired or wireless communication.

The image forming apparatus 10 forms an image on a sheet and outputs the sheet on which the image is formed as a printed matter. This image forming apparatus 10 is implemented with the functionality of performing a copy job to optically read an original and output a printed matter by the use of the read image data, a scan job to save the read image data as a file and transmit the read image data to an external device, a print job to output a printed matter by the use of print data (image data) transmitted from an external device, and the like job.

Figure 7:
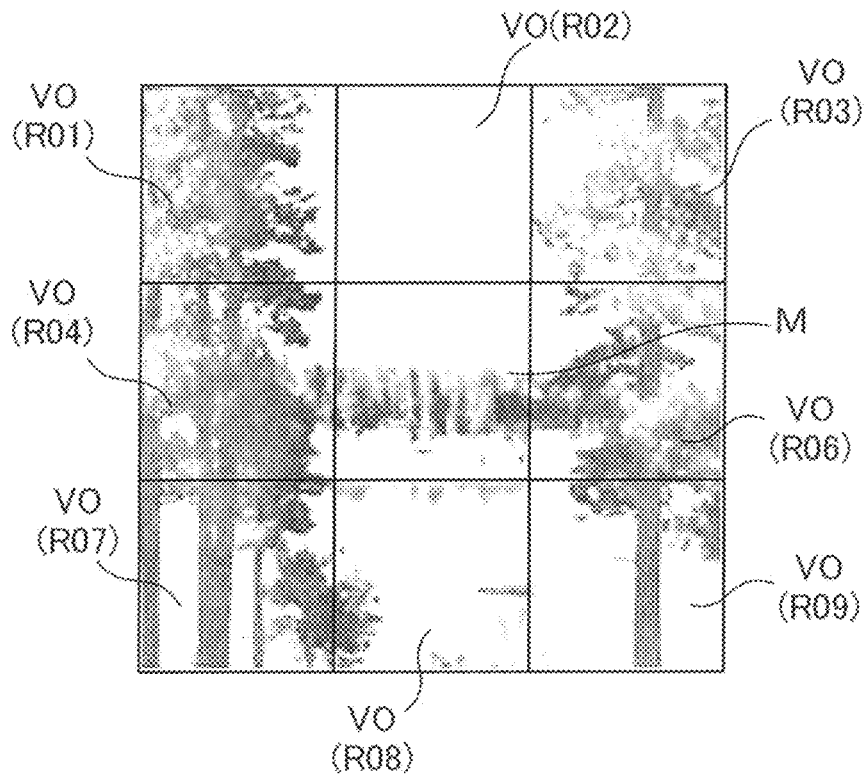
FIG. 7 is a view for explaining a virtual object.

The display 50 is a display making use of an augmented reality (AR), and displays a virtual object VO (refer to FIG. 7 to be described below) with reference to a marker which is arranged in a real environment. The display 50 of the present embodiment is a glass-type wearable device which can be worn on the head of a user to display a virtual object VO in the sight of the user.

In the print system 1, a user can output a desired printed matter from the image forming apparatus 10. Also, without actually outputting a printed matter from the image forming apparatus 10, a user can simulate, by the use of the display 50, how the printed matter is seen in an installation place.

Figure 2:
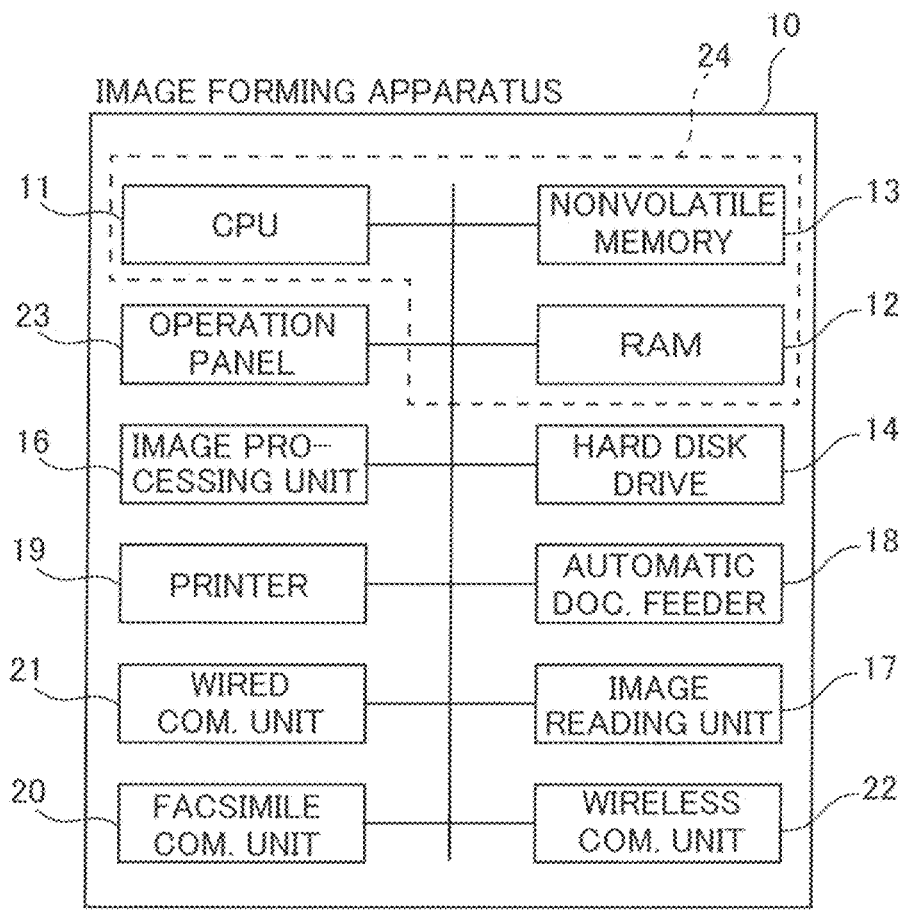
FIG. 2 is a block diagram for showing the configuration of an image forming apparatus 10 in accordance with the first embodiment.

FIG. 2 is a block diagram for showing the configuration of the image forming apparatus 10 in accordance with the present embodiment. The image forming apparatus 10 incorporates a CPU (Central Processing Unit) 11 which integrally controls the operation of the image forming apparatus 10. The CPU 11 is connected to a RAM (Random Access Memory) 12, a nonvolatile memory 13, a hard disk drive 14, an image processing unit 16, an image reading unit 17, an automatic document feeder 18, a printer 19, a facsimile communication unit 20, a wired communication unit 21 and a wireless communication unit 22, an operation panel 23 and the like through a bus.

The CPU 11 executes a variety of programs on an OS (Operating System) as a base. The nonvolatile memory 13 stores a program to activate the image forming apparatus 10 which starts in accordance with this program. Thereafter, the CPU 11 (processor) loads a program stored in the hard disk drive 14 on the RAM 12 to perform a variety of processes in accordance with the loaded program and implement a variety of functions implemented within the image forming apparatus 10.

The RAM 12 provides a working storage area in which various data is temporarily stored for performing processes based on the program executed by the CPU 11.

The nonvolatile memory 13 is a rewritable memory which can maintain stored data even if the power supply is turned off. The nonvolatile memory 13 stores a variety of programs to be executed by the CPU 11 in the form of program codes which can be read by the CPU 11. Also, the nonvolatile memory 13 stores data required for executing programs and managing the image forming apparatus 10. This data includes a counter value necessary for maintenance, user setting information set by a user through the operation panel 23 and the like. Furthermore, the nonvolatile memory 13 functions also as a buffer memory of image data during copying, printing or scanning.

The hard disk drive 14 is a nonvolatile mass storage device in which are stored an OS program, various application programs, various job histories, marker data to be described below and so forth. Also, the hard disk drive 14 stores a program (a program for controlling the operation of a job process in the own apparatus) for performing a sequence of controls in the image forming apparatus 10 by the CPU 11.

The image processing unit 16 performs predetermined processes with image data output from the image reading unit 17, for example, magnification, reduction and rotation of an image. Furthermore, the image processing unit 16 performs a rasterizing process for converting print data to image data, an image data compression/expansion process and the like.

The image reading unit 17 optically reads an original, which is placed on an original placement tray or conveyed by the automatic document feeder 18, to acquire image data. The image reading unit 17 includes, for example, a light source which irradiates an original with light, a line image sensor which receives a reflected light from the original and reads image data from one line along the sheet width direction, a shifting unit which successively shifts the reading position in the longitudinal direction of the original on a line-by-line basis, an optical route which includes lenses and mirrors which lead and focus the reflected light from the original to the line image sensor, and a conversion unit which converts analog image signals output from the line image sensor to digital image signals.

The printer 19 forms an image on a sheet in accordance with image data, and outputs the sheet on which the image is formed as a printed matter. The printer 19 in accordance with the present embodiment is structured, for example, to use an electrophotographic system, and includes a paper conveying apparatus, photoreceptor drums, a charging unit, a laser unit, a development unit, a transfer separation unit, a cleaning unit and a fixing unit. Alternatively, the printer 19 may be structured in accordance with another system.

The facsimile communication unit 20 functions to transmit and receive image data through a public telephone network to/from an external device having a facsimile (FAX) function.

The wired communication unit 21 is a module for directly communicating with a variety of external devices connected through cables, and communicating with a variety of external devices through a network connected through cables.

The wireless communication unit 22 is a module for directly communicating with a variety of external devices connected through a wireless communication, and communicating with a variety of external devices through a network connected through a wireless communication. For example, the wireless communication unit 22 directly communicates with an external device through a short distance communication. In the case of the present embodiment, the wireless communication unit 22 is used to perform communication with the display 50.

The operation panel 23 is an input means, through which user's operation is received, such as various switches, buttons or a touch panel through which information can be input in accordance with information displayed on a display. Information input from the operation panel 23 is acquired by the CPU 11. A user can issue a print job through operation of the operation panel 23. Also, the operation panel 23 functions also as a display unit under the control of the CPU 11 to display various information.

In this image forming apparatus 10, the processor such as the CPU 11, the RAM 12 and the memory such as the nonvolatile memory 13 serve as a print controller 24 which performs a variety of processes such as a marker output process and an adjustment process. These processes are performed by running programs on the CPU 11 to operate various hardware. Alternatively, the processes performed by the print controller 24 may be implemented with hardware such as circuits.

The marker output process is performed to print out a marker based on image data (hereinafter referred to as "print image data") for outputting a printed matter, i.e., marker image data to be described below. The marker functions as a mark to display a virtual object VO on the display 50, and is used by arranging it in an installation place (in the real environment) in which a user desires to place a printed matter.

Figure 3A:
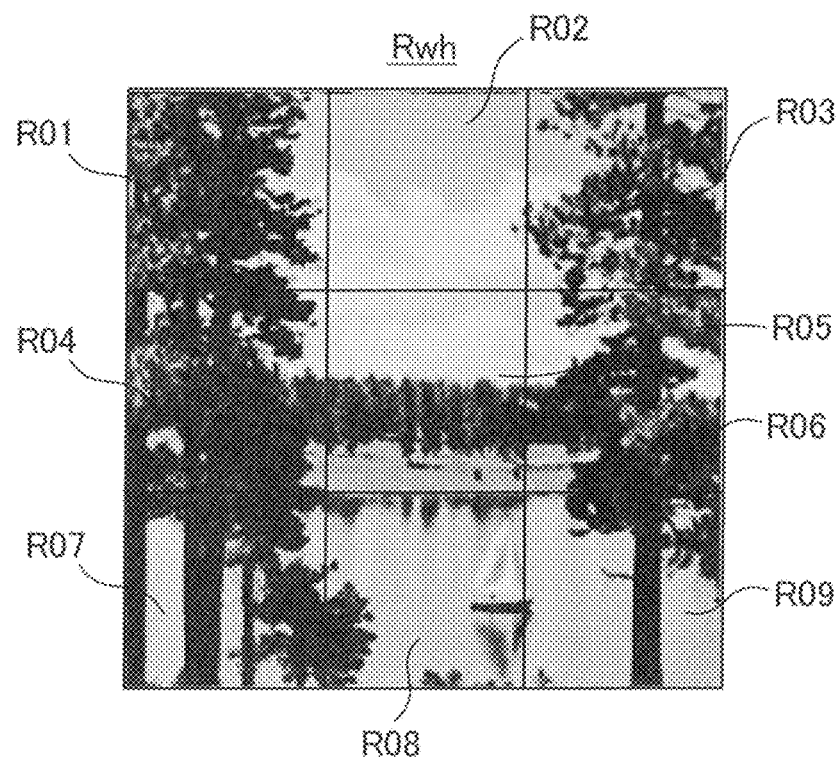
FIG. 3A is an explanatory view for explaining a marker.
Figure 3B:
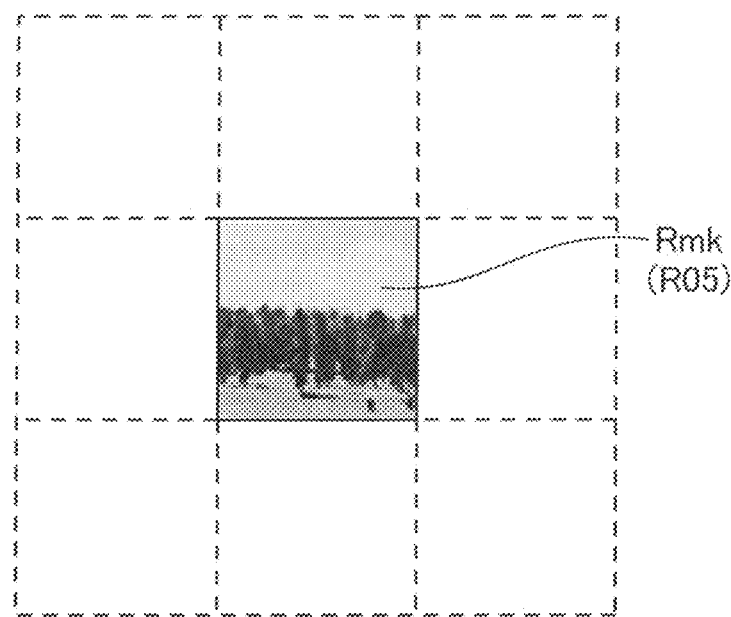
FIG. 3B is an explanatory view for explaining a marker.

FIG. 3A is an explanatory view for explaining a marker FIG. 3B is an explanatory view for explaining a marker. The hard disk drive 14 stores marker data which provides information about a marker. The marker is printed out based on a marker area Rmk which is a partial area of entire print image data Rwh. In the case of the present embodiment, the marker area Rmk corresponds to one of a plurality of partial areas obtained by dividing the entire print image data Rwh by a predetermined size. For example, the plurality of partial areas are nine partial areas R01 to R09 which is obtained by dividing the entire print image data Rwh in the form of a matrix. The marker area Rmk is set to the partial area R05 which is located in the center position. The marker data includes the entire print image data Rwh, the print image data (hereinafter referred to as "marker image data") relating to the marker area Rmk, the positional information of the marker area Rmk in the entire print image data Rwh and so forth.

The adjustment process is a process of adjusting, in accordance with a print adjustment value, the color tones (mainly, the brightness (hereinafter the same)) expressed by the printer 19. The color tone of a printed sheet output from the printer 19 can be changed by the adjustment process. The print adjustment value is output from the display 50.

Figure 4:
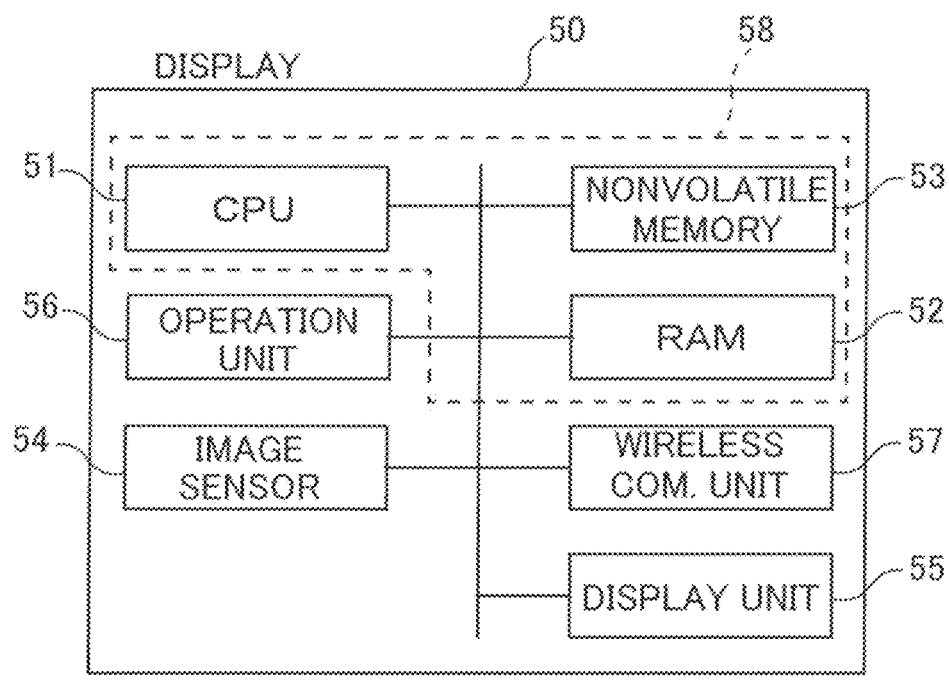
FIG. 4 is a block diagram showing the configuration of a display in accordance with the first embodiment.

FIG. 4 is a block diagram showing the configuration of the display 50 in accordance with the present embodiment. The display 50 includes a CPU 51 which integrally controls the operation of this display 50. The CPU 51 is connected to a RAM 52, a nonvolatile memory 53, an image sensor 54, a display unit 55, an operation unit 56, a wireless communication unit 57 and the like through a bus.

The CPU 51 executes a variety of programs on an OS as a base. The nonvolatile memory 53 stores a program to activate the display 50 which starts in accordance with this program. Thereafter, the CPU 51 loads and executes a program stored in the nonvolatile memory 53 on the RAM 52 to perform a variety of processes in accordance with the loaded program and implement a variety of functions of the display 50.

The RAM 52 provides a working storage area in which various data is temporarily stored for performing processes based on the program executed by the CPU 51.

The nonvolatile memory 53 is a rewritable memory which can maintain stored data even if the power supply is turned off. The nonvolatile memory 53 stores a variety of programs to be executed by the CPU 51 in the form of program codes which can be read by the CPU 51. Also, the nonvolatile memory 53 stores data required for executing programs and managing the display 50.

The image sensor 54 takes an image of a predetermined imaging area and outputs the taken image. The image sensor 54 is a so-called digital camera which images light focused through a lens on an imaging device which converts the focused light to electrical signals. The imaging device may be a solid state imaging device such as a CCD (Charge Coupled Device) type image sensor, a CMOS (Complementary Metal Oxide Semiconductor) type image sensor or the like. The imaging area of the image sensor 54 corresponds to the sight of a user wearing the display 50 on his head, or a front area of this sight.

The display unit 55 is arranged in correspondence with one eye of a user. The display unit 55 consists of a display for displaying an image (virtual object VO) and a lense unit which is arranged in front of an eye and guides the image displayed on the display to the eye of a user together with a scene of the outside world.

The image displayed on the display unit 55 is guided to the eye of a user so that the user can view an image as augmented reality (virtual object VO). In the portion of sight where the image is displayed, the user can view this image. On the other hand, in the portion of sight where the image is not displayed, the user can view the outside world (in the real environment).

Incidentally, the display unit 55 may consist only of a display in which is displayed the virtual object VO superimposed on the taken image which is taken by the image sensor 54. Namely, in this case, the user does not transparently view the outside world, but view the outside world as the taken image.

The operation unit 56 is an operation device which is operated by a user. The operation unit 56 may be any of various devices such as a button, a switch, a touch panel and the like. A user can input predetermined commands through the operation unit 56.

The wireless communication unit 57 is a module for directly communicating with a variety of external devices connected through a wireless communication, and communicating with a variety of external devices through a network connected through a wireless communication. For example, the wireless communication unit 57 directly communicates with an external device through a short distance communication.

In the display 50, the processor such as the CPU 51, the RAM 52 and the memory such as the nonvolatile memory 53 serve as a display controller 58 which performs a variety of processes. These processes are performed by running programs on the CPU 51 to operate various hardware.

Figure 5:
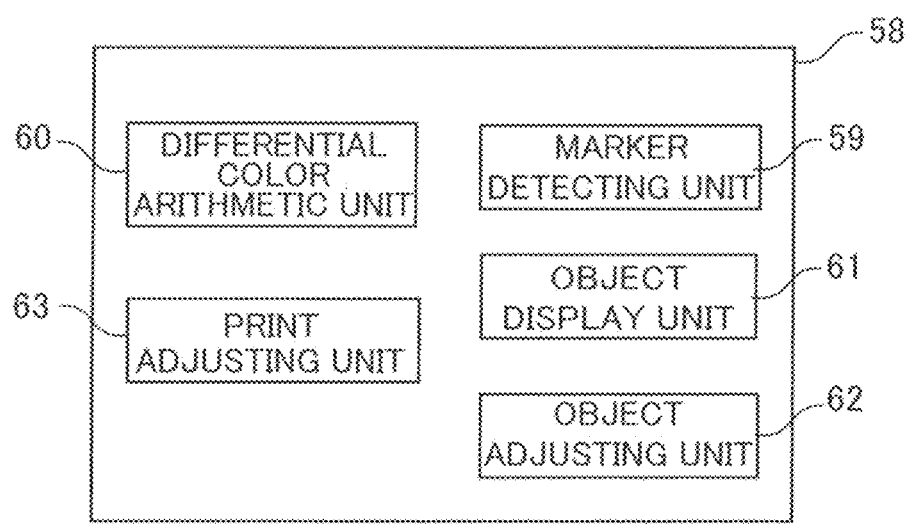
FIG. 5 is a block diagram showing the functions of a display controller.

FIG. 5 is a block diagram showing the functions of the display controller 58. As seen from a functional view point in relation to the present embodiment, the display controller 58 serves as a marker detecting unit 59, a differential color arithmetic unit 60, an object display unit 61, an object adjusting unit 62 and a print adjusting unit 63. Various functions of the display controller 58 are implemented as these units. These functions of the display controller 58 may be implemented by hardware such as circuits.

The marker detecting unit 59 detects a marker in the taken image taken by the image sensor 54, more specifically described, the position of the marker.

The differential color arithmetic unit 60 generates differential color information relating to a differential color (for example brightness difference) between color data of a marker contained in a marker taken image obtained by taking the marker with the image sensor 54 and color data of the marker which is specified in print image data.

The object display unit 61 displays the virtual object VO which reproduces the print image data on the display unit 55. Specifically, the object display unit 61 displays the virtual object VO which reproduces the print image data on the display unit 55 based on the position of a marker. In the case of the present embodiment, the virtual object VO consists of the other areas of the entire print image data Rwh except the marker area Rmk, i.e., the partial areas R01 to R04 and R06 to R09.

The object adjusting unit 62 sets an object adjustment value for adjusting the color tone of the virtual object VO displayed on the display unit 55. The virtual object VO displayed on the display unit 55 has a color tone in accordance with the object adjustment value which is set by the object adjusting unit 62.

The print adjusting unit 63 calculates a print adjustment value for adjusting the color tone which is expressed by the printer 19.

Next is an explanation of the operation of the print system 1 in accordance with the present embodiment, i.e., a color tone adjustment process of a printed matter. This print system 1 is used by a user to output a printed matter to be placed on a predetermined installation place by the image forming apparatus 10. Image data of a printed matter which a user desires to print, i.e., print image data, is input to the image forming apparatus 10. Also, the hard disk drive 14 stores marker data (including marker image data and the like) corresponding to the print image data.

First, a user inputs a command to output a marker through operation of the operation panel 23 of the image forming apparatus 10. Receiving this command, the print controller 24 prints out a marker based on the marker image data. After outputting the marker from the image forming apparatus 10, the user places the marker in the installation place of the printed matter.

Figure 6:
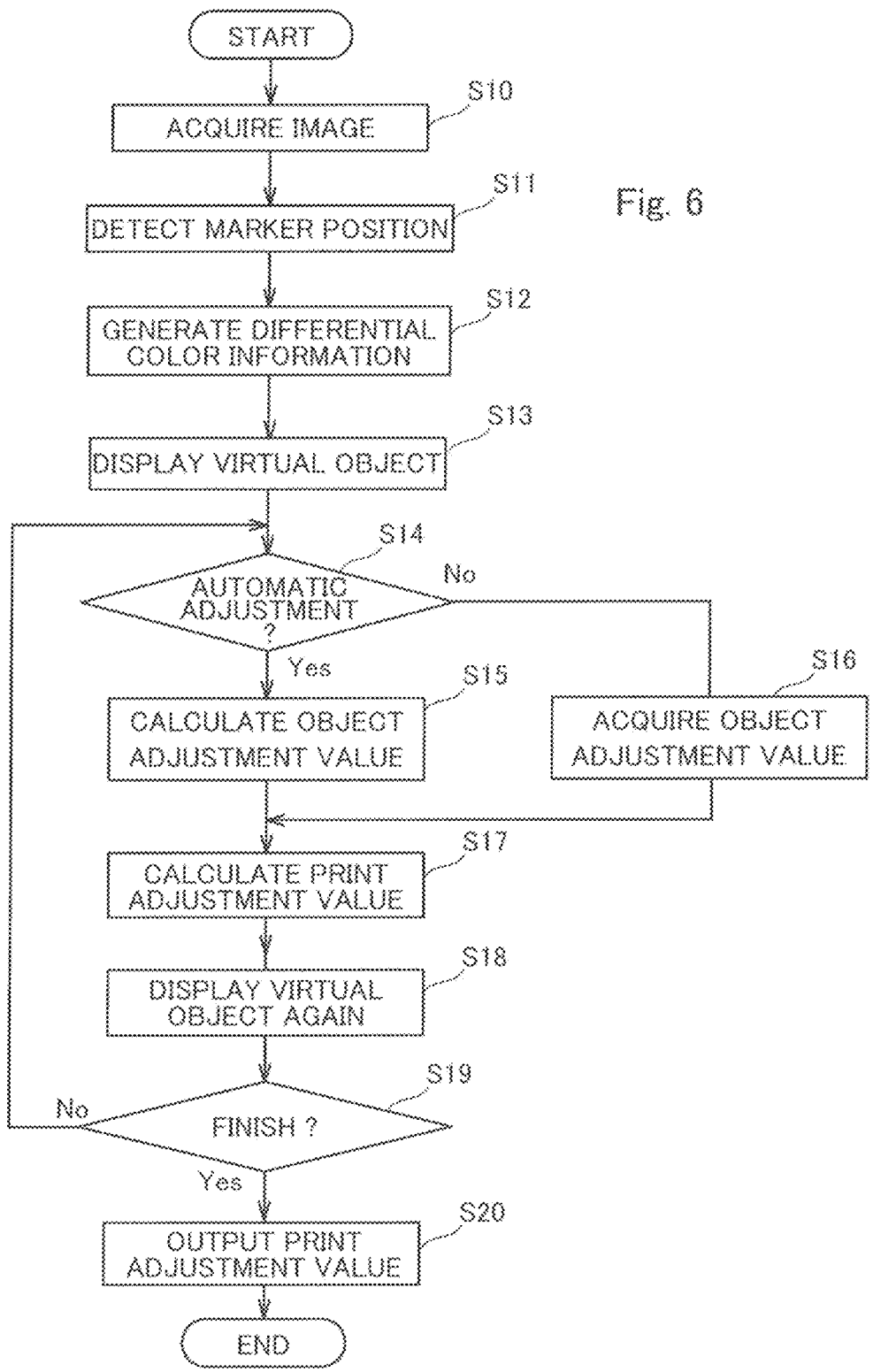
FIG. 6 is a flow chart for showing the operation of the display in a color tone adjustment process.

Next, the user adjusts the color tone of the image forming apparatus 10 which outputs the printed matter by the use of the display 50 in order that the printed matter can be seen with an original color tone irrespective of the environment of the installation place. FIG. 6 is a flow chart for showing the operation of the display 50 in the color tone adjustment process. When this process is performed, the display 50 communicates with the image forming apparatus 10 to refer to marker data.

First, in step 10 (S10), a marker taken image is acquired. The marker taken image is acquired by taking an image of the area including a marker and thereabout with the image sensor 54.

In step 11 (S11), the marker detecting unit 59 detects the position of the marker in the marker taken image.

In step 12 (S12), the differential color arithmetic unit 60 compares color data of the marker in the marker taken image and color data of the marker which is specified in print image data to generate the differential color information therebetween.

Also, after the differential color information is generated in step 12, the object adjusting unit 62 primarily sets the object adjustment value based on the differential color information as calculated. Specifically, the object adjusting unit 62 sets the object adjustment value in order that the color tone of the virtual object VO based on the print image data matches the color tone of the marker contained in the marker taken image. This makes it possible to reproduce, on the virtual object VO, the color tone of the printed matter actually placed on the installation place.

In step 13 (S13), the object display unit 61 displays the virtual object VO on the display unit 55 based on the position of the marker. A user can visually recognize, through the display unit 55, the marker M located in the installation place (real environment) and the virtual object VO which is displayed around the marker M (refer to FIG. 7).

At this time, the virtual object VO displayed on the display unit 55 is displayed in accordance with the object adjustment value (the object adjustment value which is primarily set) which is set in relation to the marker. Specifically, the color tone of the virtual object VO is changed in accordance with the object adjustment value for each of the partial areas R01 to R04 and R06 to R09 of the virtual object VO. The color tone of the virtual object VO thereby matches the color tone of the marker M placed on the installation place rather than the color tone of the print image data. Accordingly, the user can know how the printed matter placed on the installation place is seen by placing the marker on the installation place without placing the entirety of the printed matter on the installation place.

In step 14 (S14), the object adjusting unit 62 determines whether or not automatic adjustment is selected to automatically set the object adjustment value. The adjustment mode can be selected by the user through the operation unit 56. When automatic adjustment is selected, the determination in step 14 is in the affirmative and the process proceeds to step 15 (S15). Conversely, when automatic adjustment is not selected, i.e., when manual adjustment is selected to manually set the object adjustment value, the determination in step 14 is in the negative and the process proceeds to step 16 (S16).

In step 15, the object adjusting unit 62 secondarily sets the object adjustment value based on the differential color information which is calculated by the differential color arithmetic unit 60. Specifically, the object adjusting unit 62 calculates and sets the object adjustment value in order that the color tone of the virtual object VO in accordance with the object adjustment value, which is primarily set, matches the color tone of the virtual object VO based on the print image data. Namely, the primarily set object adjustment value and the secondarily set object adjustment value have the opposite directions to adjust the color tone. The secondarily set object adjustment value serves thereby to absorb fluctuation of the color tone of the printed matter due to the environment of the installation place.

In step 16, the object adjusting unit 62 acquires an input value input through the operation unit 56 as an object adjustment value to secondarily set the object adjustment value in accordance with this input value.

In step 17 (S17), the print adjusting unit 63 calculates a print adjustment value for adjusting a color tone reproduced by the image forming apparatus 10 (the printer 19) based on the secondarily set object adjustment value. The print adjustment value calculated in step 17 has an adjustment amount corresponding to the adjustment amount of the color tone of the virtual object VO based on the secondarily set object adjustment value.

Figure 8:
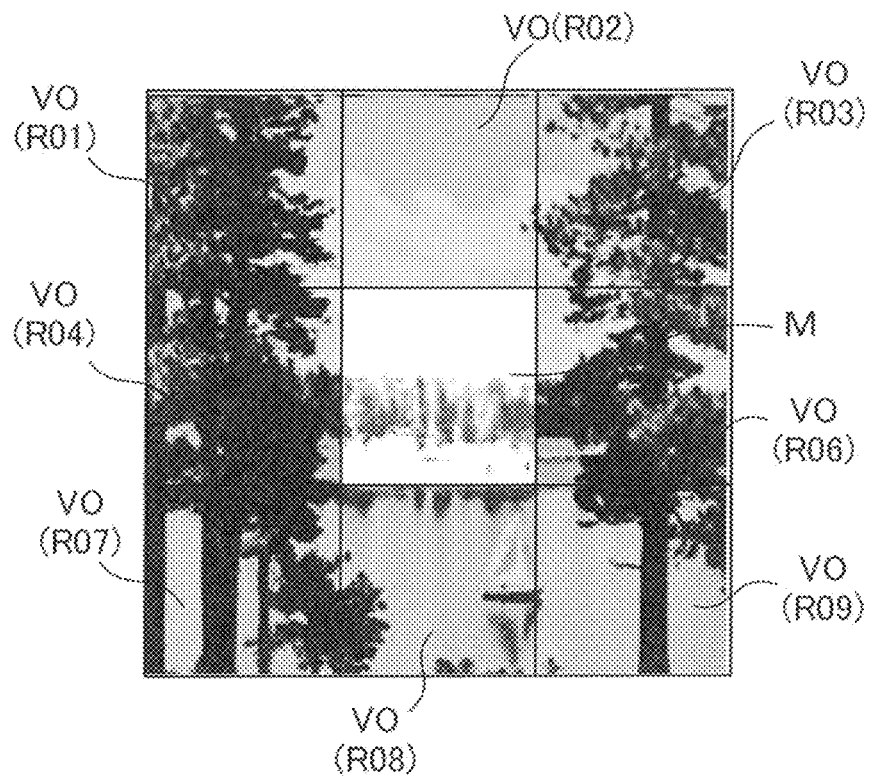
FIG. 8 is a view for explaining a virtual object.

In step 18 (S18), the object display unit 61 displays the virtual object VO again on the display unit 55. The user can visually recognize, through the display unit 55, the marker M located in the installation place (real environment) and the virtual object VO which is displayed around the marker M (refer to FIG. 8).

At this time, the virtual object VO displayed on the display unit 55 is displayed in accordance with the object adjustment value (the object adjustment value which is secondarily set) which is set in relation to the marker. Specifically, the color tone of the virtual object VO is changed in accordance with the object adjustment value for each of the partial areas R01 to R04 and R06 to R09 of the virtual object VO. The user can thereby determine whether or not the color tone of the printed matter matches the color tone which the user desires through the color tone of the virtual object VO displayed on the display unit 55.

In step 19 (S19), the object adjusting unit 62 determines whether or not it is selected to finish the color tone adjustment process. The selection to finish the color tone adjustment process can be performed by the user through operation of the operation unit 56. If it is selected to finish the color tone adjustment process, the determination in step 19 is in the affirmative and the process proceeds to step 20 (S20). Conversely, if it is not selected to finish the color tone adjustment process, i.e., if it is selected to continue the color tone adjustment process, the determination in step 19 is in the negative, and the process returns to step 14.

In step 20 (S20), the print adjusting unit 63 determines that a command to determine the print adjustment value is input, based on the fact that it is selected in step 19 to finish the color tone adjustment process. Then, the print adjusting unit 63 outputs the print adjustment value calculated in step 17 to the image forming apparatus 10.

The print controller 24 having acquired the print adjustment value adjusts the color tone (brightness) reproduced by the printer 19 based on the print adjustment value. By outputting a printed matter from the printer 19 which is adjusted with respect to the color tone and placing the printed matter on the installation place, it is therefore possible to visually recognize the printed matter with an original color tone which a user desires without being affected by the environment of the installation place.

As has been discussed above, in the case of the present embodiment, the display 50 of the print system 1 includes the display unit 55, the image sensor 54, the marker detecting unit 59, the differential color arithmetic unit 60, the object display unit 61, the object adjusting unit 62 and the print adjusting unit 63.

In accordance with this configuration, the color tone of the virtual object VO displayed on the display unit 55 can be adjusted based on the differential color information generated by the differential color arithmetic unit 60. It is therefore possible to simulate how a printed matter is seen when placed on an installation place, and simulate whether or not the printed matter is seen in a way intended by a user when the color tone of the image forming apparatus is adjusted. Thereby, there is no need for frequently repeating adjustment (print) and confirmation of color tone in the installation place. As a result, even in various installation environments, it is possible to easily obtain a printed matter with a color tone which a user desires.

Also, in accordance with the display 50 of the present embodiment, it is possible to absorb the color tone characteristics specific to the image forming apparatus 10. By this configuration, in the case where a printed matter is output by the image forming apparatus 10 of this print system 1, is possible to easily obtain a printed matter with a color tone which a user desires irrespective of the color tone characteristics specific to the image forming apparatus 10.

Also, in the case of the present embodiment, when the determination command is input through user's operation, the print adjustment value is output to the image forming apparatus 10.

By this configuration, user's intention is appropriately reflected in the adjustment process.

Furthermore, in the case of the present embodiment, the object adjusting unit 62 sets an object adjustment value in order to absorb variation of a color tone due to the environment of the installation place (automatic adjustment).

In accordance with this structure, the original color tone of a printed matter can be automatically obtained. By this configuration, it is possible to lessen an operational burden on a user.

Furthermore, in the case of the present embodiment, the object adjusting unit 62 sets an object adjustment value to the input value input through user's operation (manual adjustment).

In accordance with this structure, it is possible to obtain the color tone which user desires and obtain a printed matter which is fit for user needs.

Furthermore, in the case of the present embodiment, the marker output process is a process to print out a marker with respect to the marker area Rmk which is a partial area of the entire print image data Rwh. On the other hand, the virtual object VO is an object reproducing the remaining areas of the entire print image data Rwh except the marker area Rmk.

In accordance with this structure, a part of the printed matter can be used as a marker so that a user can be released from the troubles of placing the entirety of the printed matter to perform adjustment. By this configuration, it is possible to adjust the color tone even if the printed matter is large-sized such as a poster.

Second Embodiment

In what follows, the print system 1 in accordance with a second embodiment will be explained. The print system 1 of this second embodiment differs from that of the first embodiment in that color tone adjustment is performed by the use of a plurality of markers. Meanwhile, the second embodiment will be explained mainly with respect to the differences from the first embodiment without repeating redundant description of the construction and operations.

Figure 9:
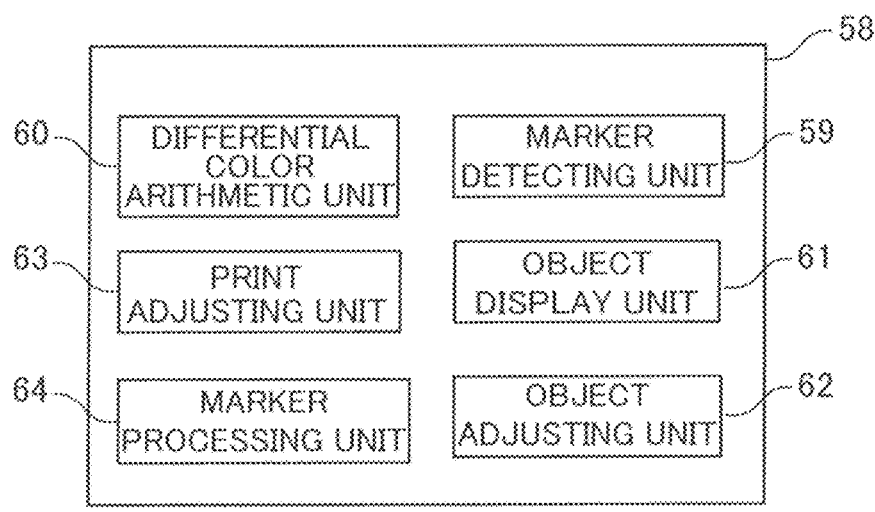
FIG. 9 is a block diagram showing the configuration of a display controller in accordance with a second embodiment.

FIG. 9 is a block diagram showing the configuration of the display controller 58 in accordance with the present embodiment. The display controller 58 in accordance with the present embodiment is provided with a marker processing unit 64 in addition to the structure of the first embodiment.

The marker processing unit 64 performs an association process and a marker setting process. The association process is a process to specify a representative color for each of the partial areas R01 to R09 and associate the representative color with the each of the partial areas R01 to R09. On the other hand, the marker setting process is a process to set, as a marker, a partial area of the partial areas R01 to R04 and R06 to R09 which is associated with a representative color whose differential color from the representative color of the marker area Rmk (the partial area R05) is larger than a predetermined threshold value. The representative color specified by the marker processing unit 64 is, for example, a color which most frequently appears in each partial area or an average color in each partial area.

Figure 10:
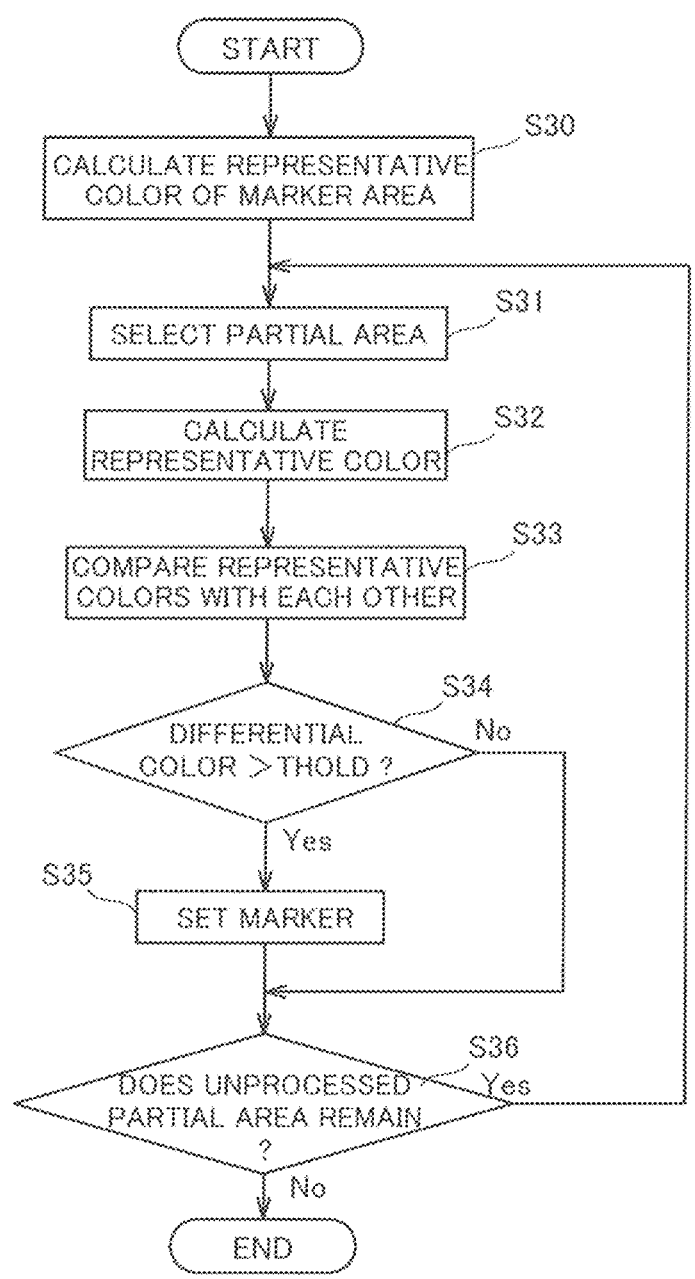
FIG. 10 is a flow chart for showing the operation of the display in accordance with the second embodiment.

FIG. 10 is a flow chart for showing the operation of the display 50 in accordance with the present embodiment. The procedure shown in this flow chart is performed as a preprocessing in advance of the adjustment process of the first embodiment.

First, in step 30 (S30), the marker processing unit 64 calculates the representative color of the marker area Rmk.

In step 31 (S31), the marker processing unit 64 selects one partial area Rn (n=01 to 09 (except 05)) from among the eight partial areas R01 to 04 and R06 to R09.

In step 32 (S32), the marker processing unit 64 calculates the representative color of the selected marker area Rn.

In step 33 (S33), the marker processing unit 64 compares the representative color of the marker area Rmk with the representative color of the partial area Rn and calculates a differential color (brightness difference) therebetween.

In step 34 (S34), the marker processing unit 64 determines whether or not the differential color calculated in step 33 is greater than a threshold value. The threshold value used in this process is used to determine whether or not there is an area having a color tone which significantly differs from those of other areas in the same printed matter, and set to a predetermined value through experiments or simulation.

If the determination in step 34 is in the affirmative, i.e., if the differential color calculated in step 33 is greater than the threshold value, the process proceeds to step 35 (S35). Conversely, if the differential color calculated in step 33 is not greater than the threshold value, the process skips step 35 and proceeds to step 36 (S36).

In step 35, the marker processing unit 64 sets the partial area Rn as a marker. In the subsequent processes, the partial area Rn is recognized as a new marker area Rmk. Also, the marker processing unit 64 notifies the image forming apparatus 10 that the new marker area Rmk is set. The image forming apparatus 10 adds the notified marker area Rmk to the marker data.

In step 36, the marker processing unit 64 determines whether or not there is a partial area of the partial areas R01 to 04 and R06 to R09 which is not processed yet to obtain a representative color. If there is a partial area of the partial areas R01 to 04 and R06 to R09 which is not processed, i.e., if the determination in step 36 is in the affirmative, the process returns to step 31. Then, the marker processing unit 64 performs the processes from step 31 with the unprocessed partial area of the partial areas R01 to 04 and R06 to R09. Conversely, if there is no partial area of the partial areas R01 to 04 and R06 to R09 which is not processed, i.e., if the determination in step 36 is in the negative, the process is finished (END).

Figure 11:
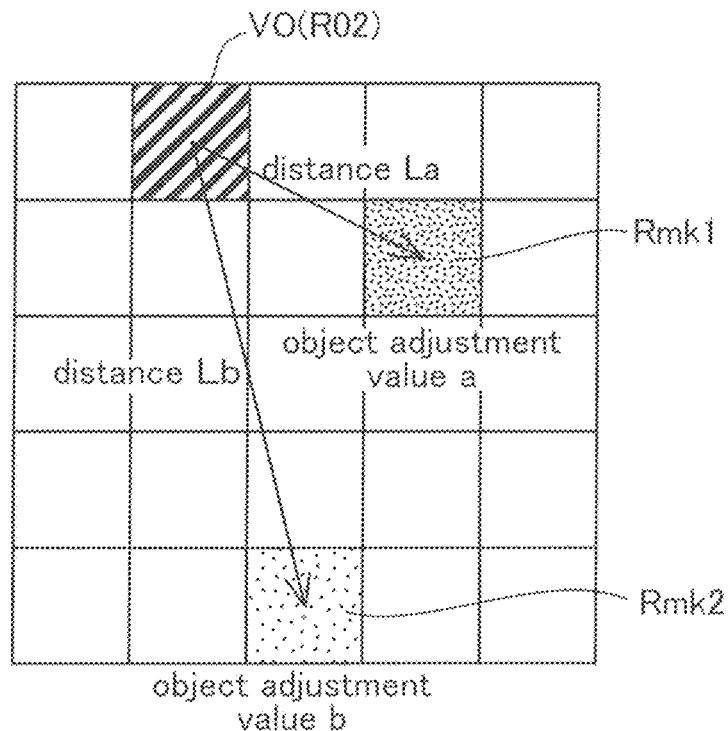
FIG. 11 is an explanatory view for showing the concept of the process of determining an object adjustment value.

Next is an explanation of the method of determining an object adjustment value in the color tone adjustment process when a plurality of marker areas Rmk are set. The following example described with reference to FIG. 11 is directed to a method of adjusting the color tone of the virtual object for each of 25 divided partial areas. In this figure, "Rmk1" and "Rmk2" indicate two marker areas, and "VO" indicates a virtual object corresponding to the partial area R02 whose color tone is adjusted.

The object adjusting unit 62 calculates an object adjustment value based on the two marker areas Rmk1 and Rmk2. Specifically, a first object adjustment value a is set with reference to the first marker area Rmk1. Likewise, a second object adjustment value b is set with reference to the second marker area Rmk2. In this case, the object adjusting unit 62 sets the object adjustment value of the virtual object VO corresponding to the partial area R02 by weighting the object adjustment values calculated with reference to the marker areas Rmk1 and Rmk2 respectively. Generally speaking, the closer the distance from a marker, the more harmonious with the marker the color tone, so that the weighting factors are coefficients f(La) and f(Lb) which are functions of the distances La and Lb to the marker areas Rmk1 and Rmk2 respectively.

$$\text{object adjustment value} = f(La) \times a + f(Lb) \times b \quad \text{(Equation 1)}$$

As has been discussed above, in the case of the present embodiment, the color tone adjustment process of a printed matter can be performed by making use of a plurality of marker areas having greater differences of color. By this configuration, it is possible to really reproduce a printed matter as seen in an installation environment, and therefore the color tone of the printed matter can be adjusted with a high degree of accuracy.

Meanwhile, in the case of the present embodiment, markers are set to some of the partial areas into which the entire print image data Rwh is equally divided. However, the method of setting markers is not limited to this technique.

Figure 12:
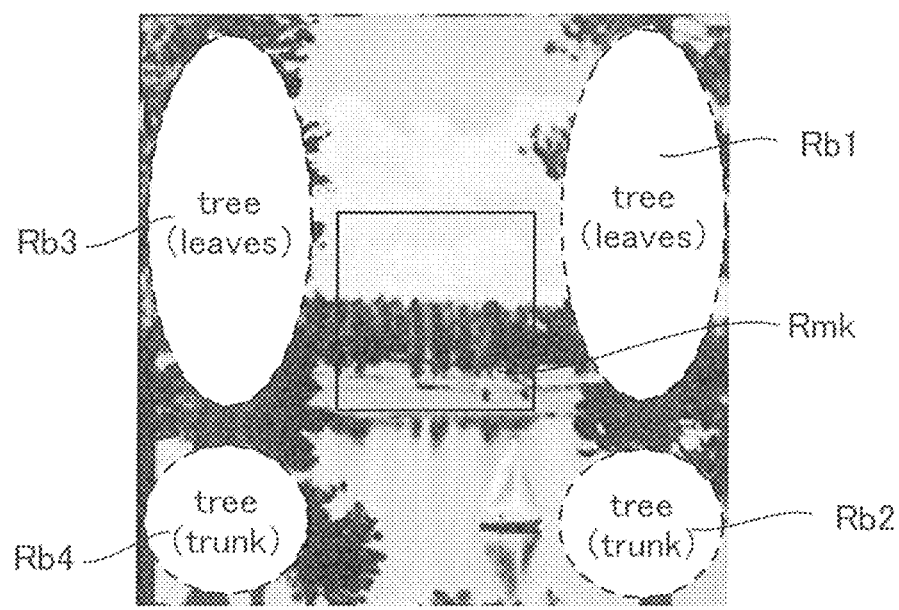
FIG. 12 is an explanatory view for showing the concept of the process of setting marker areas.

FIG. 12 is an explanatory view for showing the concept of the process of setting marker areas. In this modification example, the marker processing unit 64 performs a recognition process, an association process and a marker setting process.

The recognition process is performed to recognize components constituting the image in the area of the entire print image data Rwh except the marker area Rmk, i.e., such a component consisting of similar colors. In the example shown in FIG. 12, trees and trunks are recognized as components Rb1 to Rb4. The recognition process can be performed by a well-known image processing technique. The association process is to specify a representative color for each of the components Rb1 to Rb4 which are recognized by the recognition process, and associate the specified representative color with the each of the components Rb1 to Rb4. On the other hand, the marker setting process is to set, as a marker, a component area Rb which is associated with a representative color whose differential color from the representative color of the marker area Rmk is larger than a predetermined threshold value.

In accordance with this technique, the color tone adjustment process of a printed matter can be performed by using the components Rb1 to Rb4 constituting the image as marker areas Rmk. By this configuration, it is possible to really reproduce a printed matter as seen in an installation environment, and therefore the color tone of the printed matter can be adjusted with a high degree of accuracy.

Figure 13:
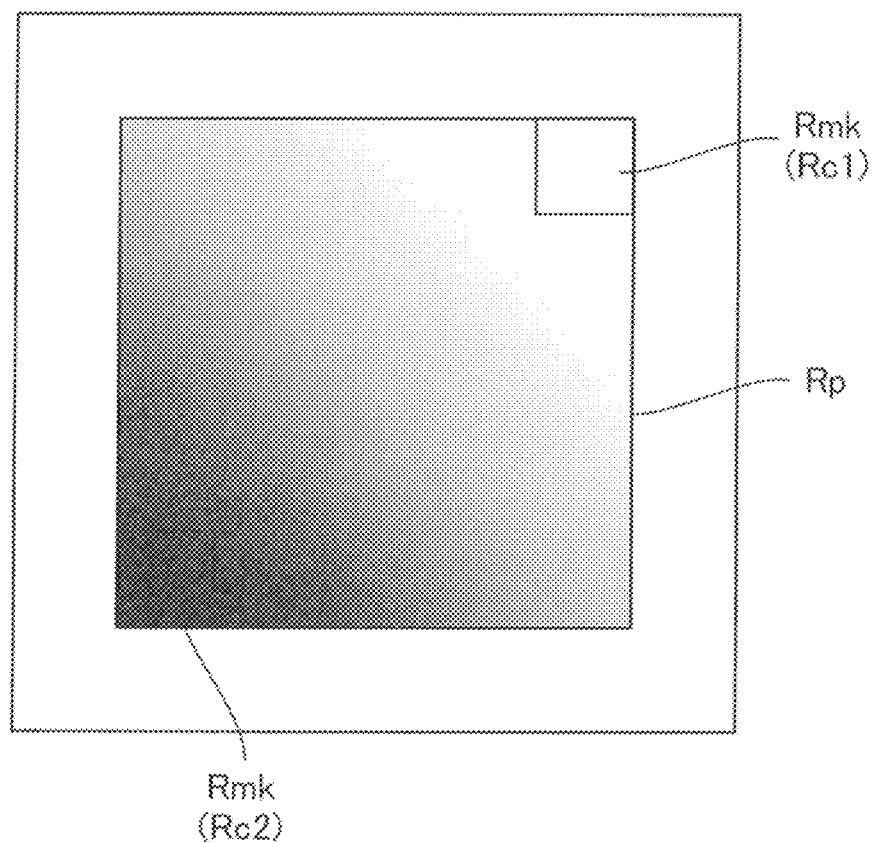
FIG. 13 is an explanatory view for showing the concept of the process of setting marker areas.

Alternatively, the method of setting markers can be performed as follows. FIG. 13 is an explanatory view for showing the concept of the process of setting marker areas. Specifically, the marker processing unit 64 acquires a taken image which is obtained by taking an image of an installation place, on which a printed matter is placed, with the image sensor 54. The marker processing unit 64 sets a plurality of partial areas which are defined by dividing the installation area Rp of the printed matter of this taken image by a predetermined size. Then, the marker processing unit 64 calculates the brightness difference between a pair of partial areas which are selected from among the plurality of partial areas. When a pair of partial areas are detected with a larger brightness difference than a predetermined threshold value, the marker processing unit 64 designates the detected partial areas Rc1 and Rc2 as marker areas Rmk respectively.

In accordance with this technique, the color tone adjustment process of a printed matter can be performed by using the marker areas Rmk in accordance with the brightness of the installation place. By this configuration, it is possible to really reproduce a printed matter as seen in an installation environment, and therefore the color tone of the printed matter can be adjusted with a high degree of accuracy.

Incidentally, in the case of the present embodiment, it is assumed that, while a plurality of marker areas are set in advance as a preprocess, the color tone adjustment process of a printed matter is performed with reference to the plurality of marker areas. However, the above process of setting marker areas Rmk is performed only if a user determines that a desired color tone of a printed matter cannot be obtained (for example, in the case of the first embodiment, if the determination in step 19 is in the negative) after the adjustment process of the printed matter is performed by setting a single marker area.

The foregoing description has been presented based on the print system according to the present disclosure. However, it is not intended to limit the present disclosure to the precise form described, and obviously many modifications and variations are possible within the scope of the invention. Also, the present disclosure can be considered to relate not only to the print system, but also to the display incorporated in the print system, the control method of the display, and the program which is executed in the display.

Furthermore, the marker processing unit is implemented in the image forming apparatus in place of the display or together with the display.

Although embodiments of the present invention have been described and illustrated in detail, the disclosed embodiments are made for purposes of illustration and example only and not limitation. The scope of the present disclosure should be interpreted by terms of the appended claims.

What is claimed is:

1. A print system comprising:
an image forming apparatus; and
a display that displays a virtual object together with a first marker arranged in a real environment,
the image forming apparatus comprising:
a printer that outputs a printed matter; and
a print controller that controls the printer,
the print controller that:
causes the printer to print out a second marker based on print image data for outputting the printed matter; and
adjusts color tones expressed by the printer in accordance with a print adjustment value,
the display comprising:
a display unit;
an image sensor that takes an image of a predetermined imaging area and outputs the taken image; and
a hardware processor that is operated to
detect the first marker in the taken image;
generate differential color information relating to a differential color between color data of the first marker in the taken image and color data of the second marker in the print image data;
display a virtual object which reproduces the print image data in the display unit together with an image taken of the first marker arranged in the real environment;
set an object adjustment value for adjusting a color tone of the virtual object displayed on the display unit based on the differential color information which is generated; and
calculate the print adjustment value used in the image forming apparatus based on the object adjustment value which is set.

2. The print system of claim 1 wherein
when a determination command is input through user operation, the hardware processor outputs the print adjustment value to the image forming apparatus.

3. The print system of claim 1, wherein
the taken image is obtained by taking an image of the first marker which is placed in an installation place on which the printed matter is placed.

4. The print system of claim 3, wherein
the hardware processor sets the object adjustment value in order to absorb variation of a color tone due to an environment of the installation place.

5. The print system of claim 1, wherein
the hardware processor sets the object adjustment value in accordance with an input value which is input through user operation.

6. The print system of claim 1, wherein
the print controller causes the printer to print out the second marker based on a marker area which is a partial area of the entire print image data, and wherein
the virtual object is an object reproducing a remaining area of the entire print image data except the marker area.

7. The print system of claim 6, wherein
the marker area is one area selected from among a plurality of partial areas obtained by dividing the entire print image data by a predetermined size, and wherein
the hardware processor of the display is further operated to
specify a representative color for each of the partial areas;
associate the specified representative color with the each of the partial areas; and
set, as an additional marker, a partial area which is associated with a representative color whose differential color from the representative color of the marker area is larger than a predetermined threshold value.

8. The print system of claim 6, wherein
the hardware processor of the display is further operated to
recognize one or more components constituting an image of the print image data;
specify a representative color for each of the one or more components which are recognized;
associate the specified representative color with the each of the one or more components; and
set, as an additional marker, a component which is associated with a representative color whose differential color from the representative color of the marker area is larger than a predetermined threshold value.

9. The print system of claim 7, wherein
the representative color is a color which most frequently appears in the partial area or an average color in the partial area.

10. The print system of claim 8, wherein
the representative color is a color which most frequently appears in the partial area or an average color in the partial area.

11. The print system of claim 6, wherein
the hardware processor of the display is further operated to
set a plurality of partial areas which are defined by dividing an installation area of the printed matter by a predetermined size based on a taken image which is obtained by taking an image of an installation place on which a printed matter is placed with the image sensor, calculate a brightness difference between the divided partial areas, and when a pair of partial areas are detected with a larger brightness difference than a predetermined threshold value, designate the detected partial areas as marker areas respectively.

12. The print system of claim 7, wherein
in the case where a plurality of areas are set as the marker area respectively, the hardware processor sets an object adjustment value of each partial area by weighting the object adjustment value calculated for each marker area with reference to the distance between the each marker area and the each partial area.

13. A display that displays a virtual object together with a first marker arranged in a real environment, comprising:
- a display unit;
- an image sensor that takes an image of a second marker which is printed out by an image forming apparatus based on print image data for outputting a printed matter, and outputs a taken image; and
- a hardware processor that is operated to
- detect the first marker in the taken image;
- generate differential color information relating to a differential color between color data of the first marker in the taken image and color data of the second marker in the print image data;
- display a virtual object which reproduces the print image data in the display unit together with an image taken of the first marker arranged in the real environment;
- set an object adjustment value for adjusting a color tone of the virtual object displayed on the display unit based on the differential color information which is generated; and
- calculate a print adjustment value for adjusting a color tone reproduced by the image forming apparatus based on the object adjustment value which is set.

14. A control method of a display that displays a virtual object together with a first marker arranged in a real environment, wherein the display is controlled to perform:
- acquiring a taken image which is obtained by taking an image of a second marker which is printed out by an image forming apparatus based on print image data for outputting a printed matter;
- detecting the first marker in the taken image;
- generating differential color information relating to a differential color between color data of the first marker in the taken image and color data of the second marker in the print image data;
- displaying a virtual object which reproduces the print image data in the display unit together with an image taken of the first marker arranged in the real environment;
- setting an object adjustment value for adjusting a color tone of the virtual object displayed on the display unit based on the differential color information which is generated; and
- calculating a print adjustment value for adjusting a color tone reproduced by the image forming apparatus based on the object adjustment value which is set.

15. A non-transitory recording medium storing a computer readable program causing a computer incorporated in a display that displays a virtual object together with a first marker arranged in a real environment to perform:
- acquiring a taken image which is obtained by taking an image of a second marker which is printed out by an image forming apparatus based on print image data for outputting a printed matter;
- detecting the first marker in the taken image;
- generating differential color information relating to a differential color between color data of the first marker in the taken image and color data of the second marker in the print image data;
- displaying a virtual object which reproduces the print image data in the display unit together with an image taken of the first marker arranged in the real environment;
- setting an object adjustment value for adjusting a color tone of the virtual object displayed on the display unit based on the differential color information which is generated; and
- calculating a print adjustment value for adjusting a color tone reproduced by the image forming apparatus based on the object adjustment value which is set.

* * * * *